(12) United States Patent
Miguchi

(10) Patent No.: US 7,093,683 B2
(45) Date of Patent: Aug. 22, 2006

(54) ALL-TERRAIN VEHICLE

(75) Inventor: Akio Miguchi, Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 385 days.

(21) Appl. No.: 10/669,723

(22) Filed: Sep. 25, 2003

(65) Prior Publication Data
US 2004/0060758 A1    Apr. 1, 2004

(30) Foreign Application Priority Data
Sep. 27, 2002    (JP)    ............... P2002-282495

(51) Int. Cl.
B60R 21/00    (2006.01)
(52) U.S. Cl. .................... 180/170; 180/271
(58) Field of Classification Search ............. 180/170, 180/271, 274, 282, 283, 284
See application file for complete search history.

(56) References Cited

U.S. PATENT DOCUMENTS 6,343,669 B1 *    2/2002    Davis et al. .............. 180/376

2003/0033874 A1 *    2/2003    Handa et al. ............ 73/494

FOREIGN PATENT DOCUMENTS

JP    61-129473    6/1986
JP    62-218243    9/1987

* cited by examiner

Primary Examiner—Faye M. Fleming
(74) Attorney, Agent, or Firm—Wenderoth, Lind & Ponack, L.L.P.

(57) ABSTRACT

An all-terrain vehicle, which limits a speed of backward movement of the vehicle to a predetermined speed and which assures a necessary power output while limiting the backward speed, without a driver's taking any manual trouble to operate a switch to control an engine of the vehicle, even though a high load is exerted upon the vehicle. The all-terrain vehicle includes a vehicle speed sensor device, a backward movement positional sensor device, and an engine controller for limiting the engine speed of the vehicle when the backward movement positional sensor device detects that the vehicle is running backward and when the vehicle speed sensor device detects that the vehicle speed reaches a predetermined value, thereby limiting the speed of the vehicle running backward.

7 Claims, 9 Drawing Sheets

ALL-TERRAIN VEHICLE

BACKGROUND OF THE INVENTION

1. Field of the Invention

The present invention generally relates to an all-terrain vehicle, and particularly relates to an all-terrain four-wheeled vehicle provided with an automatic transmission type belt converter.

2. Description of the Related Art

In a case of an all-terrain four-wheeled vehicle which is provided with a gear transmission, but not provided with a belt converter (i.e. automatic V-belt transmission), the speed reduction ratio of the gear transmission is fixed. Therefore, when the gear transmission is shifted to a backward position by which the vehicle is moved backward, and when an engine speed of the vehicle is increased by operating a throttle of the engine, the speed of the vehicle is proportional to the engine speed. In other words, when a maximum power region of the engine is used, the increment of the vehicle speed is limited within a predetermined region set when the gear transmission has been shifted to the backward position.

On the other hand, in a case of an all-terrain four-wheeled vehicle which is provided with a belt converter and a gear type sub-transmission, when the gear transmission (gear type sub-transmission) of the vehicle is shifted to the backward position, the speed reduction ratio by the belt converter automatically changes in compliance with the engine speed and a load exerted upon the belt converter. In other words, the vehicle speed is changeable from a practical speed region to an unnecessary high speed region.

As the all-terrain four-wheeled vehicle which is provided with the belt converter, there has been proposed a vehicle which has a controller for controlling the engine speed so as to prevent the vehicle speed from reaching such an unnecessary high speed, when the vehicle moves backwards. For example, the controller includes an engine speed detector, a backward movement detector, an ignition limiter for cutting ignition of the engine when the engine speed reaches a predetermined value during the backward movement of the vehicle, and an ignition cut release switch which is of a manual button type, or of a manual lever type.

FIG. 11 is a flowchart showing steps for controlling the engine by the conventional controller. That is, at step S100, it is determined whether the position of the gear transmission (gear position) is a reversion position (i.e., position for the backward movement of the vehicle) or not. If YES, it proceeds to step S200 in which it is determined whether the ignition cut release switch is open or not. If YES, it proceeds to step S300 in which it is determined whether the engine speed is over and above a set value (predetermined value) or not. If YES, it proceeds to step S400 in which the ignition of the engine is cut so as to decrease the engine speed to a speed up to the set value.

Namely, when the engine speed becomes more than the predetermined value during backward movement of the vehicle, the ignition of the engine is cut so as to limit the engine speed to under the predetermined value. On the other hand, when the driver of the vehicle desires, the ignition cut of the engine can be released by operating (handling) the ignition cut release switch manually, in order to increase the engine speed.

Incidentally, as prior art relating to the present invention, Japanese Laid-Open Patent Publication No. 61-129473 discloses a straddle type all-terrain four-wheeled vehicle having no belt converter, in which when the engine speed is more than a predetermined value during backward movement of the vehicle, the engine speed is limited to a value under the predetermined value.

Concerning the all-terrain four-wheeled vehicle provided with the belt converter in which the engine speed is detected while the vehicle is running backwards and in which the engine speed is controlled to be smaller than the predetermined value, there are some problems as follows. That is, (1) when a high load is exerted upon the belt converter during backward movement of the vehicle, a large power output (i.e. large drive power) is necessary. At this time, the driver must take the trouble to operate the ignition cut release switch manually inconveniently, in order to increase the engine speed, (2) it is necessary to arrange the ignition cut release switch near the driver, and there must be an arrangement of wiring which connects the ignition cut release switch to a controller, etc., thus creating additional cost, and (3) when the load exerted upon the belt converter frequently varies during backward movement of the vehicle, the operation of the ignition cut release switch is troublesome.

SUMMARY OF THE INVENTION

Therefore, it is an object of the present invention to provide an all-terrain vehicle, which prevents a speed of the vehicle from being over and above a predetermined speed (i.e. from being unnecessarily high) when the vehicle moves backward and which secures a necessary power output while limiting the speed of the vehicle, without taking the trouble to operate a switch to control the engine manually, even though a high load is exerted upon the belt converter when the vehicle moves backward and/or even though the load exerted upon the belt converter frequently varies when the vehicle moves backward.

It is another object of the present invention to provide the all-terrain vehicle having an engine control mechanism which is assembled from a small number of parts, thus realizing a low cost.

In accomplishing the above objects of the present invention, there is provided an all-terrain vehicle having a belt converter, comprising: a vehicle speed detection mechanism for detecting a vehicle speed of the vehicle; a backward movement detection mechanism for detecting a backward movement of the vehicle; and an engine control mechanism for automatically controlling an engine speed of an engine of the vehicle, so as to make the vehicle speed lower than a predetermined vehicle speed, when the backward movement detection mechanism detects the backward movement of the vehicle and when the vehicle speed detection mechanism detects that the vehicle speed reaches the predetermined vehicle speed. In the arrangement, the engine control mechanism can control the engine speed, for example, by limiting an ignition of the engine, or by limiting a supply of fuel to the engine.

According to the arrangement, the engine speed (i.e. the number of revolutions of the engine) is controlled with reference to the vehicle speed, as a reference (i.e. standard), upon the backward movement of the vehicle. Therefore, when a high load is exerted upon the belt converter during backward movement of the vehicle, it is possible to keep the vehicle speed low while increasing the engine speed (the number of revolutions of the engine) in order to increase the power output of the engine, without performing a switching operation to cancel a control of the engine speed such as a cut of ignition of the engine for example, thus making it possible to cope with the high load.

Also, according to the arrangement, even though the load exerted upon the belt converter frequently varies when the vehicle moves backward, the driver does not have to perform the switching operation frequently to cancel the control of the engine speed such as the ignition cut for example, thus making it possible to cope with the change of the load, as well.

In the arrangement, preferably, there is further provided a gear transmission, wherein the backward movement detection mechanism is a mechanism for detecting that the gear transmission is shifted to a reverse position (i.e., a position for backward movement of the vehicle).

According to the arrangement, the mounting of the backward movement detection mechanism to the vehicle becomes easy. Also, as the backward movement detection mechanism, it is possible to employ a backward movement detection mechanism for a conventional indicator which indicates a position of speed change of the vehicle. In the arrangement, for example, the backward movement detection mechanism can detect a backward position of a shift rod of the gear transmission, and the backward movement detection mechanism can have an approximate switch arranged so as to oppose an edge surface of the shift rod.

Alternatively, in a case that the all-terrain vehicle has a rotation member in which a rotational direction of the rotation member when the all-terrain vehicle moves forwards is opposite to a rotational direction of the rotation member when the all-terrain vehicle moves backward, the backward movement detection mechanism can be a mechanism for detecting the rotational direction of the rotation member when the all-terrain vehicle moves backward.

According to the arrangement, of all the rotation members in which a rotational direction of the rotation members when the all-terrain vehicle moves forwards is opposite to a rotational direction of the rotation members when the all-terrain vehicle moves backward, in a drive power transmission system of the vehicle, it is possible to optionally select one rotation member with respect to which the backward movement detection mechanism is easy to mount. That is, according to the arrangement, it is possible to expand a degree of freedom for positioning the backward movement detection mechanism relative to the vehicle.

Preferably, the predetermined vehicle speed, as a reference to execution of the control of the engine speed by the engine control mechanism, is set to be one of a first speed at which the belt converter starts an automatic shift from a state of a generally maximum reduction ratio in speed when the all-terrain vehicle accelerates backward with a throttle of the engine opening wide, and a second speed in the vicinity of the first speed.

According to the arrangement, the vehicle speed upon the backward movement of the vehicle, is limited to a region in speed which is able to be realized when a state of the belt converter is fixed to be a low state (i.e. state of maximum reduction ratio in speed). Therefore, even though the engine speed (the number of revolutions of the engine) is increased, both of the speed of the vehicle moving backward and the power output of the engine are maintained within a practical degree.

BRIEF DESCRIPTION OF THE DRAWINGS

The above objects and features of the present invention will become clear from the following description taken in conjunction with preferred embodiments thereof with reference to the accompanying drawings.

DETAILED DESCRIPTION OF THE PREFERRED EMBODIMENTS

Figure 1:
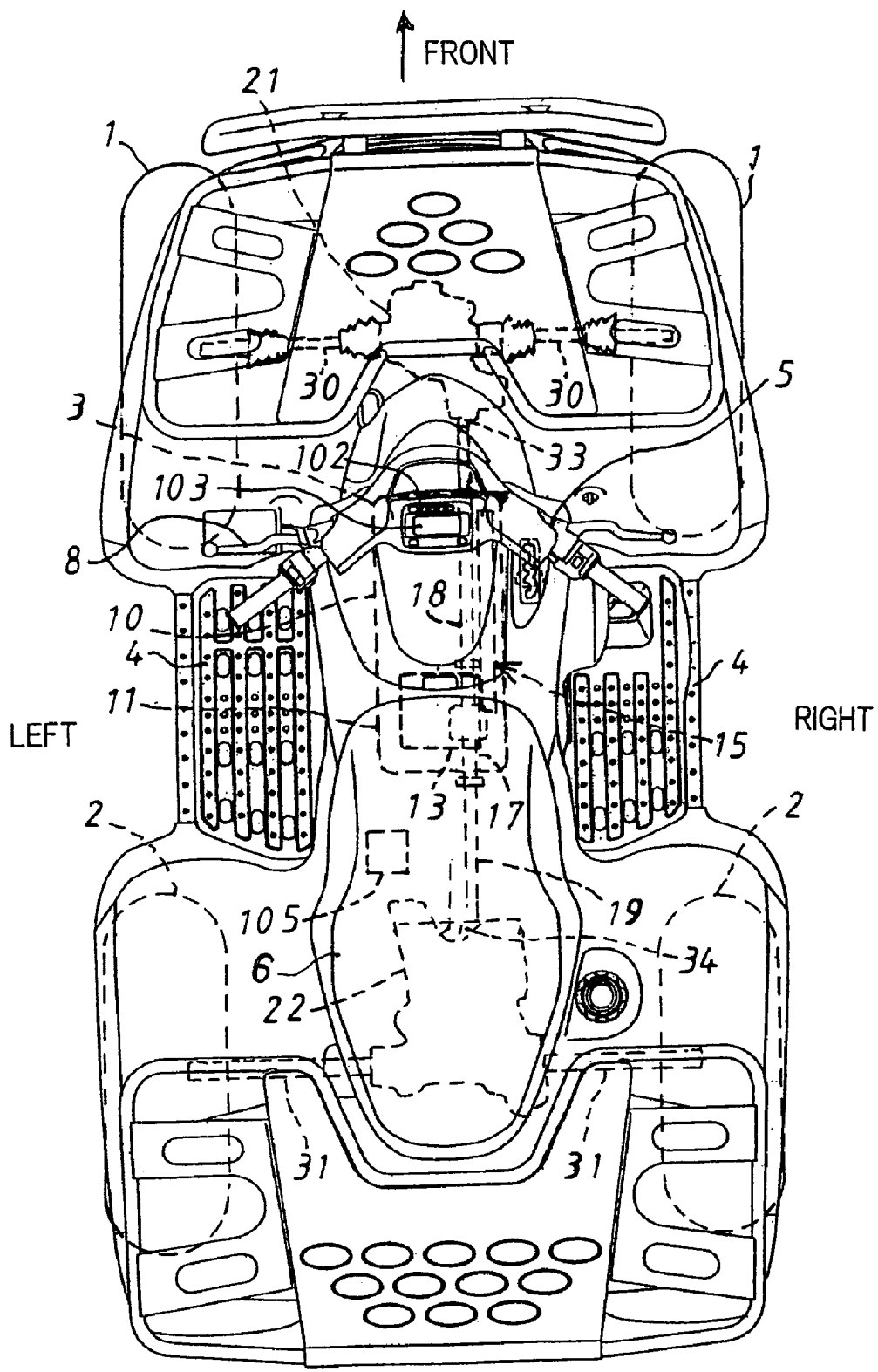
FIG. 1 is a plan view showing a straddle type all-terrain four-wheeled vehicle according to an embodiment of the present invention.

Before a description of preferred embodiments of the present invention proceeds, it is to be noted that like or corresponding parts are designated by like reference numerals throughout the accompanying drawing.

With reference to FIGS. 1 through 10, a description is made below upon a straddle type all-terrain four-wheeled vehicle according to each of first to third embodiments of the present invention. Hereinbelow, the straddle type all-terrain four-wheeled vehicle, is simply referred to as a "vehicle".

First, with reference to FIGS. 1 through 7, the description is made of a vehicle according to the first embodiment of the present invention.

FIG. 1 is a plan view showing the vehicle. In the explanation below, a "right and left direction" is defined as such a direction that a driver is taken as a reference with respect to a body of the vehicle and with respect to a direction in which the vehicle moves forward.

The vehicle has right and left front wheels (also, hereinbelow referred to as a "front wheel pair") 1, right and left rear wheels (also, hereinbelow referred to as a "rear wheel pair") 2, an engine 3 between the front wheel pair 1 and the rear wheel pair 2, and foot-steps 4 on both sides of the body of the vehicle. Further, as shown in FIG. 1, there is arranged a handlebar 5 for steering the vehicle in a front upper part of the body, and there is arranged a straddle type seat 6 in a rear upper part of the body. The handlebar 5 has a grip part provided with a brake lever 8 and so on.

A crank case 10 of the engine 3 extends rearward, and the crank case 10 has a transmission case 11 integrally at a rear part of the crank case 10. There is provided a gear transmission (i.e. gear type sub-transmission) 13 inside the transmission case 11, and there is provided an automatic belt converter (i.e. automatic V-belt transmission) 15 on a right side of the crank case 10, which is located upstream of a transmitting path of a drive power from the engine for the vehicle with respect to the gear transmission 13.

Under the transmission case 11, a drive shaft 17 extends back and forth. A front part of the drive shaft 17 is connected to a gear mechanism accommodated inside a reduction gear case 21 for the front wheel pair 1, via a propeller shaft 18 for the front wheel pair 1. On the other hand, a rear part of the drive shaft 17 is connected to a gear mechanism accommodated inside a reduction gear case 22 for the rear wheel pair 2, via a propeller shaft 19 for the rear wheel pair 2.

Figure 2:
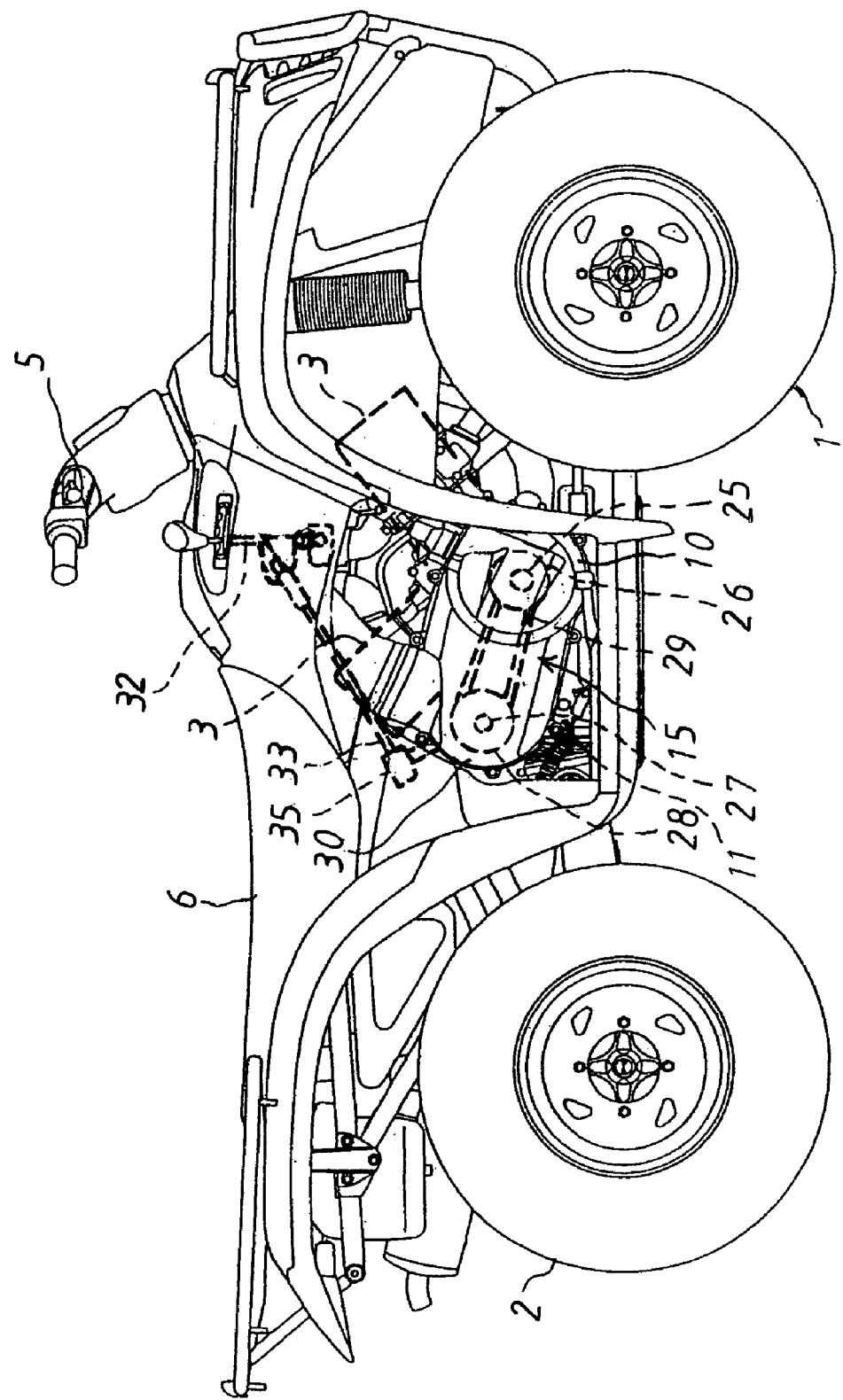
FIG. 2 is a right side view of the straddle type all-terrain four-wheeled vehicle of FIG. 1.

FIG. 2 is a right side view of the vehicle of FIG. 1. As shown in the figure, the belt converter 15 has a drive pulley 26 which is mounted on a drive shaft 25, a driven pulley 28 which is mounted on a driven shaft 27. The drive pulley 26 is located forward of the driven pulley 28, and a V-belt 29 is wound around both of the pulleys 26, 28. The drive pulley 26, the drive shaft 25, the driven pulley 28, the driven shaft 27, and the V-belt 29 are all covered by a belt converter cover 30.

As shown in FIG. 2, there is arranged a shift operation lever 32 in the vicinity of the handlebar 5. The shift operation lever 32 is interlocked with an outer change lever 35 of the transmission case 11 through a connection rod 33.

(Structure of Belt Converter)

Figure 4:
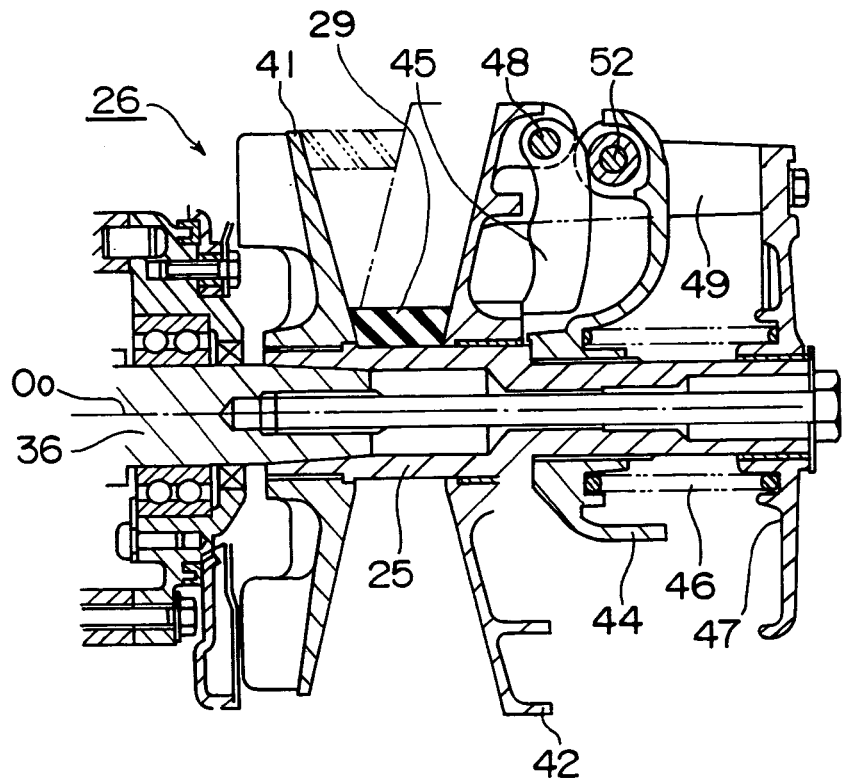
FIG. 4 is a longitudinal cross sectional view of a drive pulley of the automatic belt converter.

FIG. 4 is a cross sectional view, taken along an axis O0 of a crank shaft 36 of the engine, of the drive pulley 26. The drive shaft 25 for the belt converter 15 is integrally connected to a right end part of the crank shaft 36. The drive pulley 26 is composed of a fixed sheave 41 on a left side and of a movable sheave 42 on a right side. The fixed sheave 41 is mounted on the drive shaft 25 such that the former is not rotatable relative to the latter and such that the former is not movable relative to the latter in a direction of the crank shaft axis O0.

On the other hand, the movable sheave 42 is mounted on the drive shaft 25 such that the former can integrally rotate relative to the latter in a direction of rotation through a spider 44 and such that the former is movable relative to the latter in the direction of the crank shaft axis O0.

Behind the movable sheave 42, there is provided a propulsion generating mechanism, for the drive pulley 26, which is composed of the spider 44, a plurality of flyweights 45, a pressure adjustment spring 46, a support disk 47, and so on. Each of the flyweights 45 is pivoted rotatably about one of pins 48 which are mounted on a back side of the movable sheave 42, and each of free ends of the flyweights 45 opens towards the spider 45 (i.e. toward a right side in FIG. 4) due to a centrifugal force, as the number of revolutions of the crank shaft 36 increases. A connection arm 49 is formed on the back side of the movable sheave 42. The connection arm 49 passes through the spider 44 and extends towards the support disc 47 (i.e. rightwards in FIG. 4) such that the support disc 47 is connected to a right edge part of the connection arm 49. The support disc 47 is movable along the drive shaft 25 in the direction of the crank shaft axis O0, and the support disc 47 is rotatable relative to the drive shaft 25.

The spider 44 is screwed to the drive shaft 25, and the spider 44 has pressure receiving rollers 52 with which the flyweights 45 contact respectively. The pressure adjustment spring 46 is mounted between the spider 44 and the support disk 47 in a state in which the pressure adjustment spring 46 is compressed between the spider 44 and the support disk 47.

In the construction, the support disk 47 is biased rightwards, and the movable sheave 42 is also biased rightwards through the connection arm 49. That is, the pressure adjustment spring 46 exerts a force in a direction in which the movable sheave 42 and the fixed sheave 41 are kept away from each other, namely, in a direction in which the movable sheave 42 and the fixed sheave 41 open relative to each other. When the flyweights 45 open as an engine speed of the engine 3 increases, the movable sheave 42 is moved leftwards together with the support disk 47 against the biasing force exerted by the pressure adjustment spring 46, due to a reaction force relative to the pressure receiving roller 52. As a result, the V-belt 29 is sandwiched (pinched or pressed) between the fixed sheave 41 and the movable sheave 42.

Figure 3:
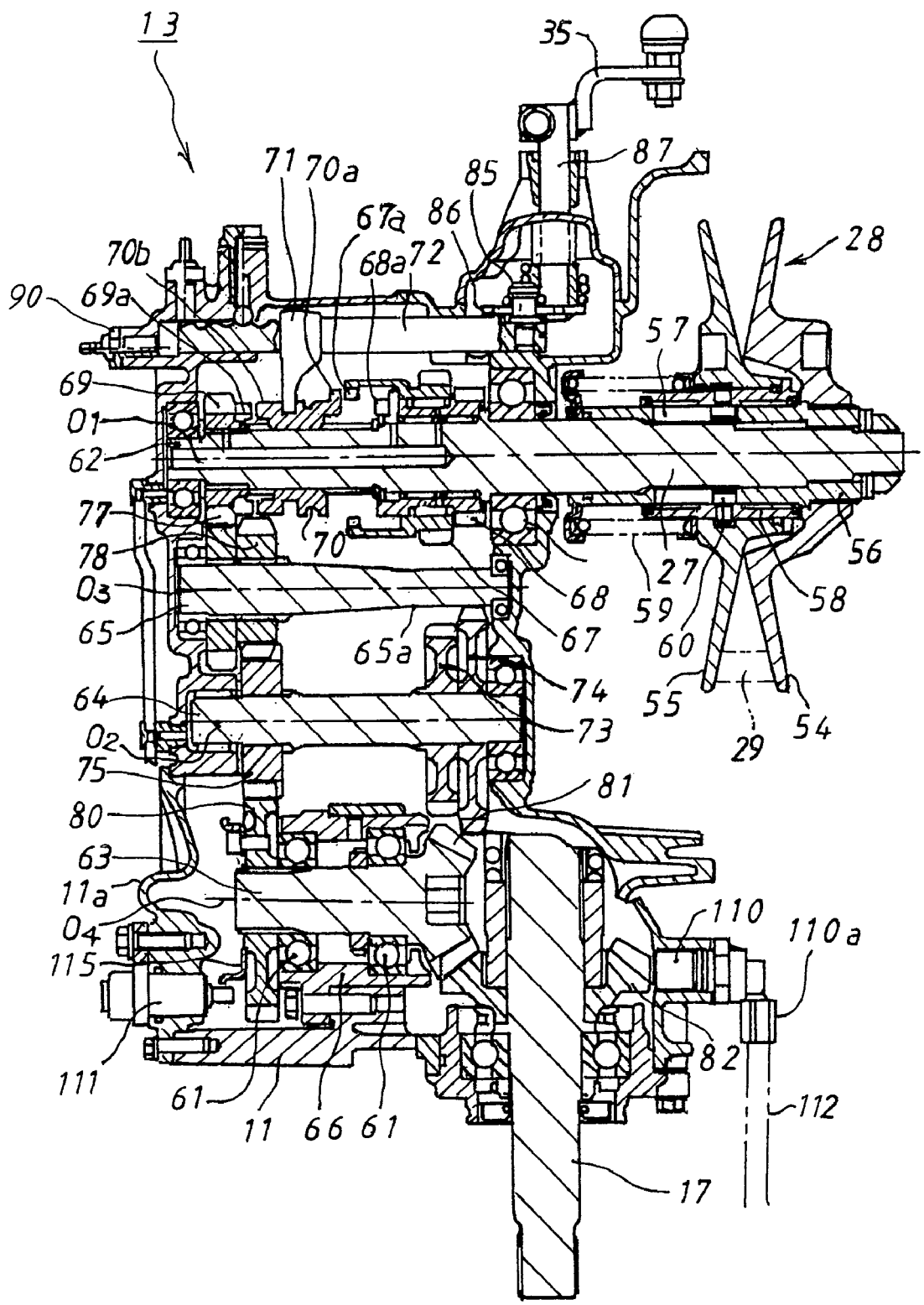
FIG. 3 is a view showing a gear transmission and a driven pulley of an automatic belt converter, in a cross section taken along a plane passing through respective axes of the gear.

As shown in FIG. 3, the driven shaft 27 of the belt converter 15 is integrated with an input shaft 62 of the gear transmission 13. The driven pulley 28 has a fixed sheave 54 on a right side and a movable sheave 55 on a left side. The fixed sheave 54 is fixed to a cylindrical cam shaft 56 which is fixed to the driven shaft 27 such that the fixed sheave 54 is not movable relative to the driven shaft 27 in an axial direction of the driven shaft 27 and such that the fixed sheave 54 is not rotatable relative to the driven shaft 27. The cam shaft 56 has a plurality of cam guide grooves 57 which are spiral-shaped.

On the other hand, the movable sheave 55 has a sleeve 58 which is fixed to an inner peripheral edge of the movable sheave 55. The sleeve 58 engages with the cam shaft 56 such that the former 58 is movable relative to the latter 56 in an axial direction of the latter 56 and such that the former 58 is rotatable relative to the latter 56. The movable sheave 55 is biased toward the fixed sheave 54 by a pressure adjustment spring 59. The sleeve 58 supports a cam roller 60. The cam roller 60 slidably engages with the cam guide grooves 57.

That is, when a tension of the V-belt 29 on a pulled side thereof increases as the load of wheels of the vehicle increases upon the vehicle's running, the movable sheave 55 rotates relatively with respect to the fixed sheave 54 in its rotational direction. At this time, both of the sleeve 58 and the movable sheave 55 are spirally moved rightward (i.e. toward the fixed sheave 54) relative to the cam shaft 56 on the basis of the cam action exerted between the cam guide grooves 57 and the cam roller 60, so that the radius of contact of the driven pulley 28 increases.

(Gear Transmission and Shift Mechanism)

The gear transmission 13, housed inside the transmission case 11, is constructed so as to be able to be switched over amongst a forward high speed position, a forward low speed position, a neutral position, and a backward position. The gear transmission 13 has the input shaft 62 which is integrated with the driven shaft 27, an output shaft 63, a counter shaft 64, an idle shaft 65 for the backward movement of the vehicle, and all of which are parallel to each other and extend in the right and left direction. The gear transmission 13 also has a shift rod 72, and the shift rod 72 is arranged in parallel with the aforementioned shafts 62–65 as well.

On a right edge part of the input shaft 62 inside the transmission case 11, there are arranged a high speed gear 67 for the forward movement of the vehicle and a low speed gear 68 for the forward movement. The high speed gear 67 and the low speed gear 68 are juxtaposed with each other, as shown in FIG. 3. On the other hand, on a left edge part of the input shaft 62, there is arranged a gear 69 for the backward movement of the vehicle, and on a middle part of the input shaft 62, there is arranged a shift sleeve 70 which engages with the input shaft 62 through a spline such that the shift sleeve 70 is movable relative to the input shaft 62 in an axial direction of the input shaft 62.

The gear 69 for the backward movement has a dog claw 69a on a right edge surface, and the gear 69 rotatably engages with the input shaft 62 through a needle bearing.

The low speed gear 68 has a boss extending leftward and a dog claw 68a on a left edge periphery of the boss, and the low speed gear 68 rotatably engages with the input shaft 62 through a needle bearing.

The high speed gear 67 has an arm extending leftward and a dog claw 67a, extending inwardly radially, on a left edge part of the arm, and the high speed gear 67 rotatably engages with an outer periphery of the boss of the low speed gear 68 for the forward movement, through a needle bearing.

The shift sleeve 70 has a left edge part which is formed as a dog claw 70b for the backward movement, and has a right edge part which is formed as a dog claw 70a for the forward movement.

The axial distance between the dog claw 67a and the dog claw 68a, is secured to such an extent that the dog claw 70a of the sleeve 70 can be once in a neutral state.

The shift sleeve 70 has an outer peripheral groove, and a shift fork 71 engages with the outer peripheral groove. The shift fork 71 is fixed to the aforementioned shift rod 72 which is supported by the transmission case 11 so as to be able to move in the right and left direction.

FIG. 3 shows that the shift rod 72 is in a neutral position. When the shift rod 72 is moved leftwards from the neutral position, the dog claw 70b of the shift sleeve 70 meshes with the dog claw 69a of the gear 69 for the backward movement, thus being set at the backward position. On the other hand, when the shift rod 72 is moved rightwards from the neutral position, the dog claw 70a of the shift sleeve 70 firstly meshes with the dog claw 67a of the high speed gear 67 for the forward movement, thus being set at the forward high speed position. Subsequently, when the shift rod 72 is further moved rightward, the dog claw 70a of the shift sleeve 70 meshes with the dog claw 68a of the gear 68 and is set at the forward low speed position after passing the neutral position.

The shift rod 72 has a right edge part which is provided with a change pin 85 projecting upward, and the change pin 85 engages with an inner change lever 86. The inner change lever 86 is connected to an outer change lever 35, through a change lever shaft 87.

The counter shaft 64 has a right edge part to which a pair of intermediate gears 73, 74 for the forward movement of the vehicle are fixed. The intermediate gears 73, 74 mesh with the forward high speed gear 67 and with the forward low speed gear 68, respectively. Meanwhile, the counter shaft 64 has a left edge part to which an intermediate output gear 75 is fixed.

The idle shaft 65 has a left edge part which has a first idle gear 77, for the backward movement, meshing with the gear 69 for the backward movement, and which has a second idle gear 78, for the backward movement, meshing with the intermediate output gear 75.

The intermediate output gear 75 meshes with an output gear 80 which is fixed to a left edge part of the output shaft 63, and a bevel gear 81 which is integrated with a right edge part of the output shaft 63 meshes with a bevel gear 82 which is fixed to the drive shaft 17.

(Engine Control Mechanism)

As shown in FIG. 1, there is arranged a controller 105 for controlling the engine 3, behind and near the transmission case 11, and the transmission case 11 accommodates a vehicle speed detection mechanism and a backward movement detection mechanism.

That is, as shown in FIG. 3 showing an inside of the transmission case 11, there is provided a vehicle speed sensor 110, as the vehicle speed detection mechanism, which faces (opposes) a peripheral surface of the bevel gear 82 fixed to the drive shaft 17. The vehicle speed sensor 110 is screwed into a right wall of the transmission case 11. The vehicle speed sensor 110 outputs an electric pulse by detecting a change in magnetic flux which passes through a detecting element provided at a tip part of the vehicle speed sensor 110. Namely, the vehicle speed sensor 110 detects teeth surfaces of the bevel gear 82, and the vehicle speed sensor 110 outputs a vehicle speed signal in a form of the number of pulses per unit time (or in a form of frequency of pulses) to an electric cable 112.

On the other hand, there are provided a backward movement positional detecting switch 90 (refer to FIG. 5) which is located so as to oppose a left edge surface of the shift rod 72, a rotor 115 for detection fixed to the output gear 80, and a backward movement detecting sensor 111, as the backward movement detection mechanism. The backward movement positional detecting switch 90 is screwed into a left wall of the transmission case 11, and the backward movement detecting sensor 111 is screwed into the right wall of the transmission case 11. One of them can be employed for the backward movement detection mechanism. The first embodiment of the present invention is explained as having a construction in which the backward movement positional detecting switch 90 is employed as the backward movement detection mechanism. Incidentally, another embodiment is explained as having the backward movement detecting sensor 111.

Figure 5:
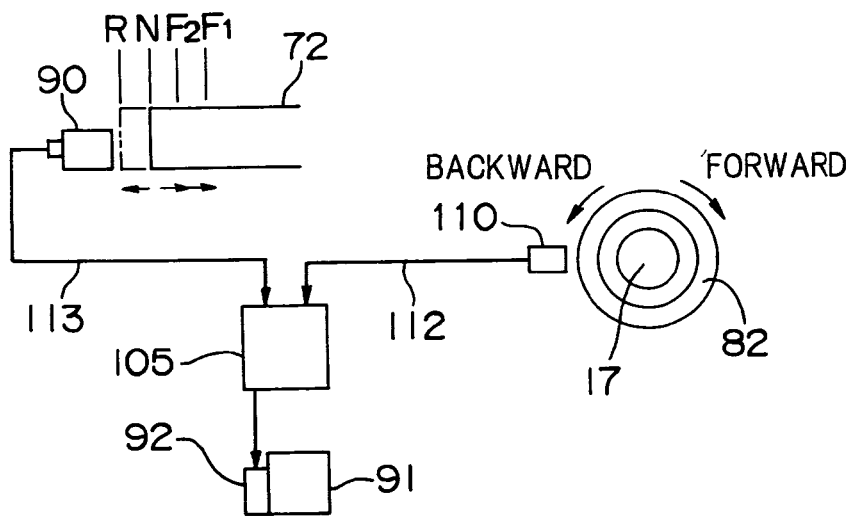
FIG. 5 is a schematic diagram showing the engine control mechanism according to a first embodiment of the present invention.

FIG. 5 is a diagram showing the engine control mechanism of the vehicle of FIG. 1. As shown in the figure, the controller 105, mounted on the body of the vehicle, has an output part which is electrically connected to an engine speed control circuit 92 of an ignitor 91 for the engine 3. Also, the controller 105 has an input part which is electrically connected to the vehicle speed sensor 110 via an electric cable 112 and which is electrically connected to the backward movement positional detecting switch 90 via an electric cable 113. The vehicle speed sensor 110 outputs the vehicle speed signal via the electric cable 112, as aforementioned.

The backward movement positional detecting switch 90 detects whether a free end of the shift rod 72 is close to the switch 90 or not. That is, when the free end of the shift rod 72 moves to a backward movement position (reverse position) "R" (i.e. left side position, shown by an imaginary line, in FIG. 5) from a neutral position "N", namely when the free end of the shift rod 72 moves into a detection region in which the backward movement positional detecting switch 90 can detect the free end of the shift rod 72, the backward movement positional detecting switch 90 functions. Then, the backward movement positional detecting switch 90 outputs the backward movement detection signal to the controller 105 via the electric cable 113.

The controller 105 operates in accordance with a program, on the basis of which the controller 105 outputs an ignition cut instruction signal to the engine speed control circuit 92 of the ignitor 91 in order to cancel ignition of the engine 3 when the backward movement positional detecting switch 90 outputs the backward movement detection signal and when the vehicle speed signal outputted from the vehicle speed sensor 110 reaches, or exceeds, a predetermined value.

(Setting of Predetermined Value of Vehicle Speed)

A predetermined value of vehicle speed, used as a reference to cut the ignition of the engine 3, is set to be a vehicle speed Vc at which an automatic shift of the belt converter starts during acceleration of the vehicle with a throttle of the engine being open wide, or is set to be near the speed Vc.

Figure 6:
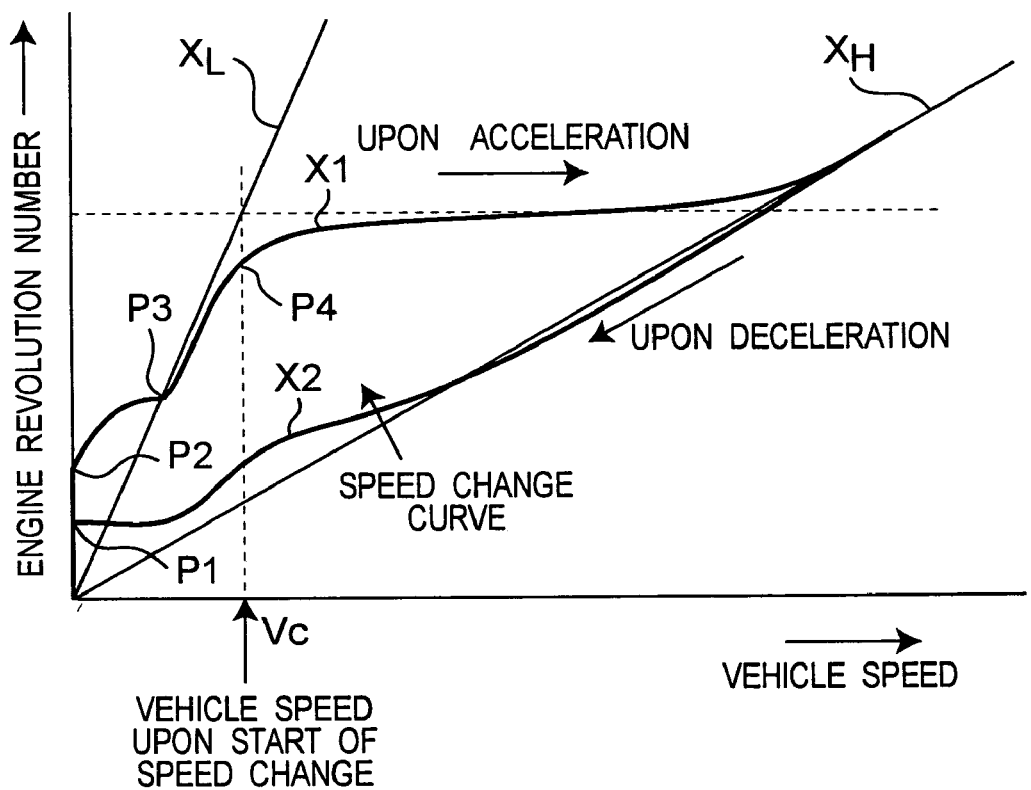
FIG. 6 shows a relation between an engine speed and a vehicle speed of the straddle type all-terrain four-wheeled vehicle of FIG. 1.

Explaining it more in detail with reference to FIG. 6, a curve X1 denotes the speed change in acceleration of the vehicle at the time of opening the throttle wide, a curve X2 denotes the speed change in deceleration of the vehicle, a straight line XL denotes a theoretical change in speed when the belt converter 15 is set to be in a low state (i.e. in a maximum reduction ratio in speed), and a straight line XH denotes a theoretical change in speed when the belt converter 15 is set to be in a high state (i.e. in a minimum reduction ratio in speed). The vehicle speed Vc is set to be a vehicle speed of a point P4 or its nearby speed in the curve X1 of FIG. 6 at the time of acceleration, at which the driven pulley 28 (refer to FIG. 3) starts opening and at which the automatic shift of the belt converter begins, from the low state in which both of the engine speed and the vehicle speed increase along the straight line XL.

Incidentally, a region between a point P1 and a point P2 is the region in which the engine 3 idles. In the region, the vehicle speed is zero even though the number of revolutions of the engine 3 increases. On the other hand, a region between the point P2 and a point P3 is the region in which a clutch of the vehicle is half-disengaged. In the region, part of the drive power of the engine 3 is transmitted to the driven pulley 28, and the vehicle speed increases with an inclination gentler than an inclination of the straight line XL. On the other hand, a region between the point P3 and a point P4 is a region in which the vehicle accelerates in the low state.

(Power Transmission System)

In FIG. 1, a rotation power of the engine 3 is transmitted to the front wheel pair 1 and the rear wheel pair 2, via the belt converter 15, the gear transmission 13, the drive shaft 17, and the propeller shafts 18, 19, respectively.

(Upon Forward Movement at High Speed)

In FIG. 3, when the shift sleeve 70 is moved rightward from the neutral position, the dog claw 70a for forward movement meshes with the dog claw 67a of the high speed gear 67 for forward movement, resulting in the setting of the forward movement high speed position.

The rotational power of the input shaft 62 is transmitted to the output shaft 63, via the high speed gear 67 for the forward movement, the intermediate gear 73, the counter shaft 64, the intermediate output gear 75 and the output gear 80. As a result, the output shaft 63 is rotated in a direction of the forward movement of the vehicle, and the drive shaft 17 is rotated in the direction of the forward movement of the vehicle via the bevel gears 81, 82.

(Upon Forward Movement at Low Speed)

When the shift sleeve 70 is moved further rightward from the forward movement high speed position, the dog claw 70a for forward movement meshes with the dog claw 68a of the low speed gear 68 for forward movement, resulting in the setting of the forward movement low speed position.

The rotational power of the input shaft 62 is transmitted to the output shaft 63, via the low speed gear 68, the intermediate gear 74, the counter shaft 64, the intermediate output gear 75 and the output gear 80. As a result, the output shaft 63 is rotated in the direction of the forward movement of the vehicle, and the drive shaft 17 is rotated in the direction of the forward movement of the vehicle via the bevel gears 81, 82.

(Upon Backward Movement)

In FIG. 3, when the shift sleeve 70 is moved leftward from the neutral position, the dog claw 70b for the backward movement meshes with the dog claw 69a of the gear 69 for the backward movement, resulting in the setting of the backward movement position.

The rotational power of the input shaft 62 is transmitted to the output shaft 63, via the gear 69 for backward movement, the first idle gear 77, the idle shaft 65, the second idle gear 78, the intermediate output gear 75 and the output gear 80. As a result, the output shaft 63 is rotated in a direction of the backward movement of the vehicle, and the drive shaft 17 is rotated in the direction of the backward movement of the vehicle via the bevel gears 81, 82.

(Power Transmission by Belt Converter)

When the engine 3 stops, each of the flyweights 45 is closed as shown by a solid line in FIG. 4. In the state, the movable sheave 42 is located at a position furthest from the fixed sheave 41 (i.e. located in the right extremity in FIG. 4), and the drive power is cut between the V-belt 29 and the drive pulley 26 (i.e. a belt-clutch-off state).

When the engine 3 is started, the flyweights 45 start opening due to the centrifugal force, and the movable sheave 42 starts moving towards the fixed sheave 41 (i.e. leftward in FIG. 4). When the engine speed starts exceeding the engine idling rotational region (i.e. exceeding the region between the points P1 and P2 in FIG. 6), the V-belt 29 starts to be pinched between the movable sheave 42 and the fixed sheave 41. As a result, part of the power from the engine 3 starts to be transmitted from the V-belt 29 to the drive pulley 26 under the state of the half-clutch (refer to the region from the point P2 to the point P3 in FIG. 6).

As the engine speed further increases from the state of the half-clutch, the state of the half-clutch is changed into a belt-clutch-on state in which the power is transmitted from the drive pulley 26 shown in FIG. 4 to the driven pulley 28 shown in FIG. 3 under the low state having the maximum reduction ratio in speed (refer to the region from the point P3 to the point P4 in FIG. 6).

When the engine speed further increases and exceeds the engine speed corresponding to the vehicle speed Vc, the automatic shift of the belt converter starts. That is, the width between the movable sheave 42 and the fixed sheave 41 becomes narrower (i.e. the movable sheave 42 moves more towards the fixed sheave 41) such that the radius of contact between the V-belt 29 and the drive pulley 26 increases, and width between the movable sheave 55 and the fixed sheave 54 of the driven pulley 28, shown in FIG. 3, increases such that the radius of contact between the V-belt 29 and the driven pulley 28 decreases. In other words, the reduction ratio becomes smaller.

(Engine Control)

In FIG. 5, when the shift rod 72 is in the neutral position "N", a free end (i.e. a left edge surface) of the shift rod 72 is kept away from the detection region by the backward movement positional detecting switch 90. Namely, in the state, the backward movement positional detecting switch 90 does not detect any backward movement position.

When the shift rod 72 is moved rightward to a forward movement high speed position F2 or to a forward movement low speed position F1, the shift rod 72 is moved in a direction in which the shift rod 72 is moved away from the backward movement positional detecting switch 90. Therefore, the state in which the backward movement positional detecting switch 90 does not detect the backward movement position, is maintained.

Meanwhile, when the shift rod 72 is moved leftward to the backward movement position (reverse position) "R" from the neutral state shown in FIG. 5, and when the free end of the shift rod 72 enters the detection region by the backward movement positional detecting switch 90, the switch 90 is in a state of detection of the shift rod 72. Namely, in the state, the switch 90 outputs the backward movement detection signal to the controller 105.

The vehicle speed sensor 110 continuously counts the teeth surfaces of the bevel gear 82, and the sensor 110 outputs the signal of vehicle speed on the basis of the number of pulses, to the controller 105.

When the controller 105 receives the backward movement detection signal outputted from the backward movement positional detecting switch 90, and when the controller 105 determines that the vehicle speed signal outputted from the vehicle speed sensor 110 exceeds the predetermined value, the controller 105 outputs the ignition cut instruction signal to the engine speed control circuit 92 of the ignitor 91, thus cutting the ignition of the engine 3.

Based upon the cut of the ignition of the engine 3, the engine speed decreases, and at the same time the vehicle speed decreases. And when the vehicle speed is below the speed Vc at which the automatic shift of the belt converter starts, the ignition cut is cancelled.

Figure 7:
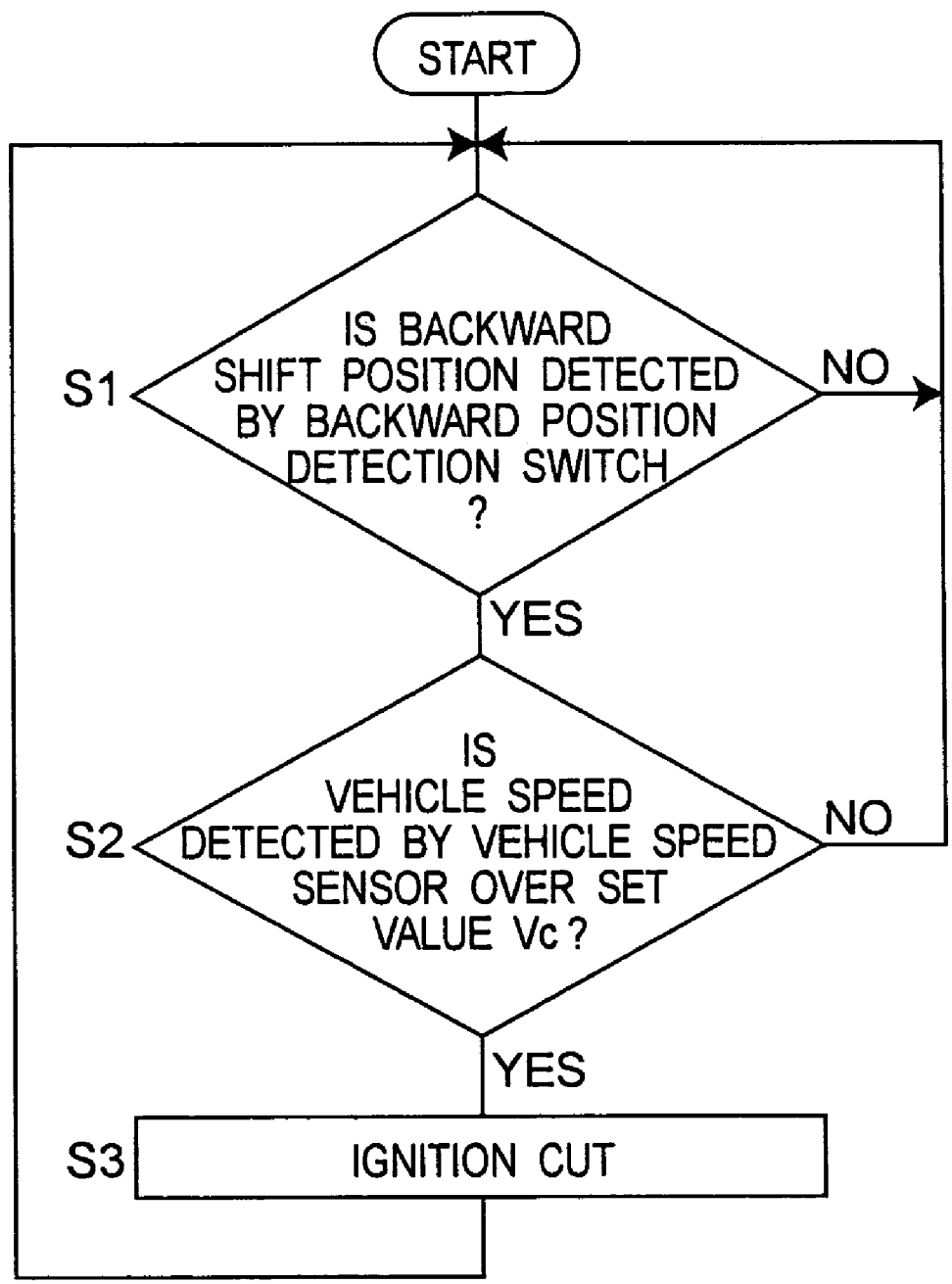
FIG. 7 is a flowchart showing steps taken by the engine control mechanism of FIG. 5.

FIG. 7 is a flowchart showing steps taken by the engine control mechanism of the straddle type all-terrain four-wheeled vehicle of FIG. 1. Referring to the flowchart, it is determined at step S1 whether the shift position is the backward movement position (i.e. backward movement gear position) or not. If it is determined at the same step that the shift position is the backward movement position, it proceeds to step S2 where it is determined whether the vehicle speed has reached the predetermined value of "Vc" or not. If it is determined at the same step that the vehicle speed has reached the predetermined value of "Vc", the ignition of the engine 3 is cut such that the engine speed is decreased.

According to the first embodiment of the present invention, when a high load is exerted upon the vehicle during the backward movement of the vehicle and the state of the belt converter 15 is changed into the low state such that the vehicle speed is decreased, it is possible to make the vehicle go backward (or rearward) by making use of a relatively greater power output region of the engine, only with the operation of the throttle of the engine to increase the engine speed.

Also, according to the first embodiment, when the aforementioned high load is changed into a low load, and when the vehicle speed increases, there is no need of hasty or sudden operation to close the throttle and/or hasty or sudden operation of the ignition cut release switch, etc., different from the aforementioned conventional vehicle, because the vehicle speed is controlled not to exceed the predetermined value.

Figure 8:
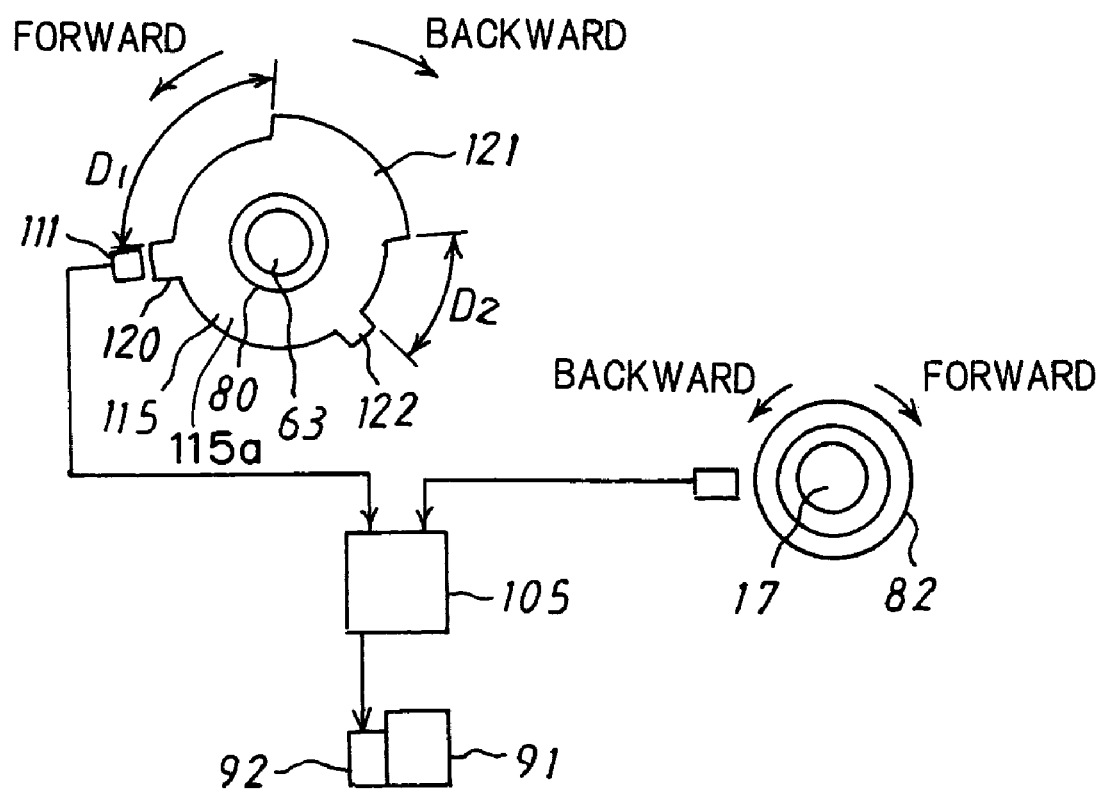
FIG. 8 is a schematic diagram showing the engine control mechanism according to a second embodiment of the present invention.
Figure 9:
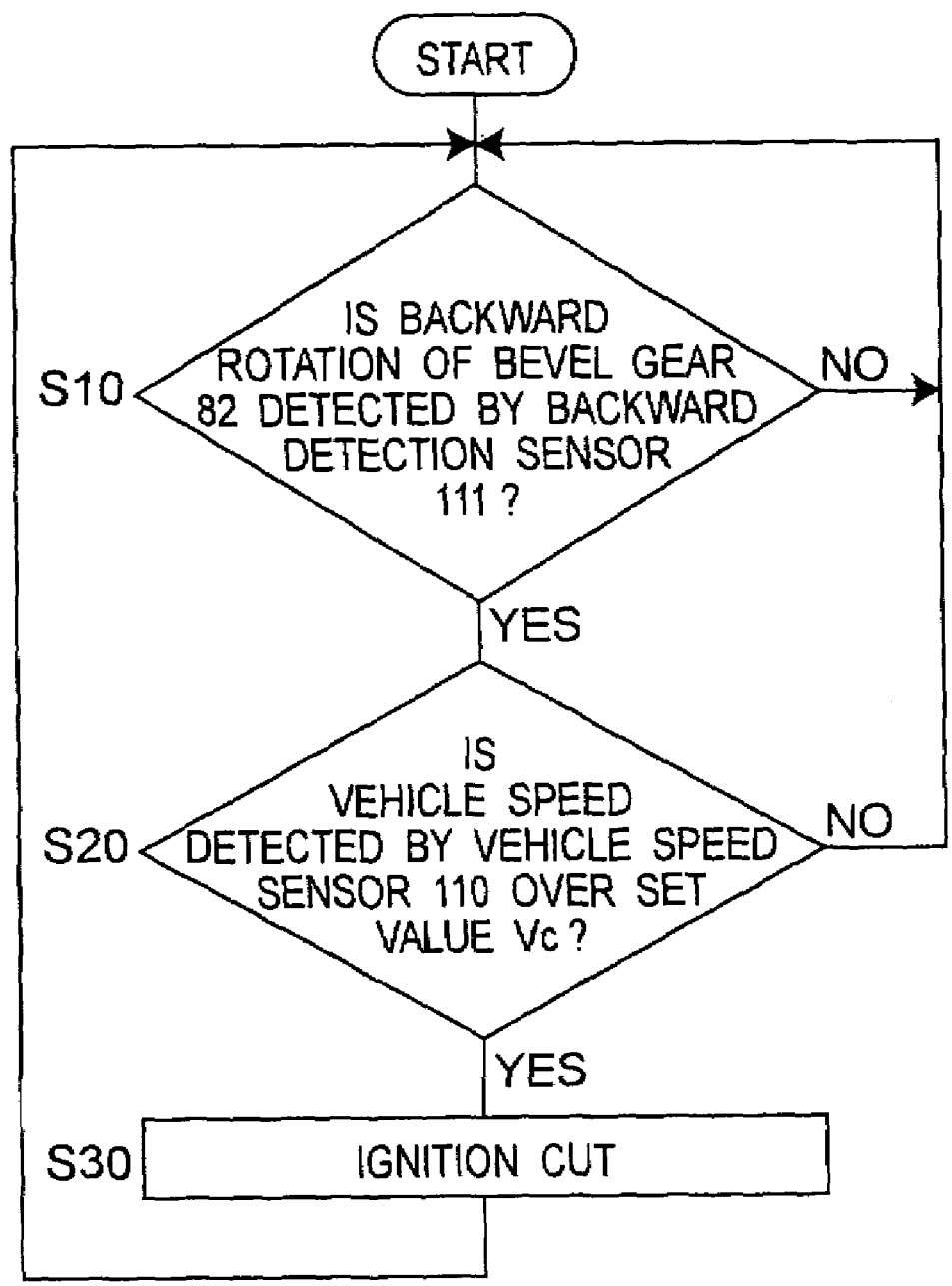
FIG. 9 is a flowchart showing steps taken by the engine control mechanism of FIG. 8.

Next, with reference to FIGS. 8 and 9, a vehicle is described according to the second embodiment of the present invention.

Namely, in the second embodiment, instead of employing the backward movement positional detecting switch 90 as shown in FIGS. 3 and 5, the rotor 115 for detection and the backward movement detecting sensor 111 which opposes a peripheral surface of the rotor 115 for detection are utilized as the backward movement detection mechanism. The rotor 115 is fixed to an edge surface of the output gear 80 which is fixed to the output shaft 63. Similar to the aforementioned vehicle speed sensor 110, the backward movement detecting sensor 111 outputs an electric pulse by detecting a change in magnetic flux which passes through a detection element provided at a tip part of the sensor 111.

By the way, the output shaft 63 with the output gear 80 rotate in reverse directions, upon forward and backward movements of the vehicle.

FIG. 8 shows the engine control mechanism, according to the second embodiment, in which the rotor 115 for detection and the backward movement detection sensor 111 are employed. As shown in the figure, the rotor 115 has three detecting projections 120, 121, 122 which project radially outwardly from a main body 115a of the rotor 115, in a state in which the three detecting projections 120, 121, 122 are arranged circumferentially along the main body at unequal intervals. More specifically, one 121 of the three detecting projections is constructed to be the longest in the circumferential direction, and the one 121 occupies approximately ¼ of the total circumference of the body of the rotor 115. On the other hand, each of the other two 120, 122 of the detecting projections are constructed to be shorter in the circumferential direction than the above one 121, as shown in FIG. 8. The longest projection 121 serves as a reference projection (i.e. standard projection), one projection 120 of the shorter projections is located on a forward side (i.e., in a direction of forward rotation) of the longest projection 121 with a long circumferential distance D1 existing between adjacent edges of the longest projection 121 and the one projection 120 (i.e. approximately 90 degrees between the adjacent edges of the longest projection 121 and the one projection 120 relative to an axis of the output shaft 63), and the other projection 122 of the shorter projections is located on a backward side (i.e., in a direction of backward rotation) of the longest projection 121 with a short circumferential distance D2, shorter than D1, existing between adjacent edges of the longest projection 121 and the other projection 122 (i.e. approximately 45 degrees between the adjacent edges of the longest projection 121 and the other projection 122 relative to an axis of the output shaft 63).

According to the arrangement, the three detecting projections 120, 121, 122 are positioned circumferentially at unequal intervals as aforementioned. Therefore, it is possible to generate different pulse waveforms between a state in which the output shaft 63 rotates forwards and a state in which the output shaft 63 rotates backward, and thus possible to determine that the rotation is a backward rotation when the pulse waveform generated upon backward movement of the vehicle is inputted to the controller 105.

FIG. 9 is a flowchart showing steps taken by the engine control mechanism of FIG. 8. That is, it is determined at step S10 whether the vehicle is moving backward or not, by the backward movement detecting sensor 111. If it is determined at the same step that the vehicle is moving backward, it proceeds to step S20 where it is determined whether the vehicle speed reaches a predetermined speed or not. If it is determined at the same step that the vehicle speed reaches the predetermined speed, the ignition of the engine 3 is cut.

As a modification to each of the first and second embodiments in which the ignition of the engine 3 is cut or cancelled in order to slow down the engine speed, it is possible to employ a system in which the ignition of the engine is thinned out.

As another modification to each of the first and second embodiments in which the aforementioned ignition limitation mechanism is employed, it is possible to employ a mechanism in which fuel from a fuel injector of the engine is cut or limited.

As another modification to each of the first and second embodiments, instead of employing the construction, as shown in FIG. 3, in which the rotor 115, detected by the backward movement detecting sensor 111, is fixed to the output gear 80 of the output shaft 63, it is possible to employ a construction in which the rotor 115 for detection is mounted on another rotation member which rotates in opposite rotational directions between a state in which the vehicle moves forward and a state in which the vehicle moves backward. For example, in the gear transmission 13 shown in FIG. 3, it is possible that the rotor 115 for detection is mounted on the bevel gear 81 of the output shaft 63, the intermediate output gear 75 of the counter shaft 64, or the bevel gear 82 of the drive shaft 17. Alternatively, it is possible that the rotor 115 for detection is mounted on the front wheel 1 and/or the rear wheel 2.

Figure 10:
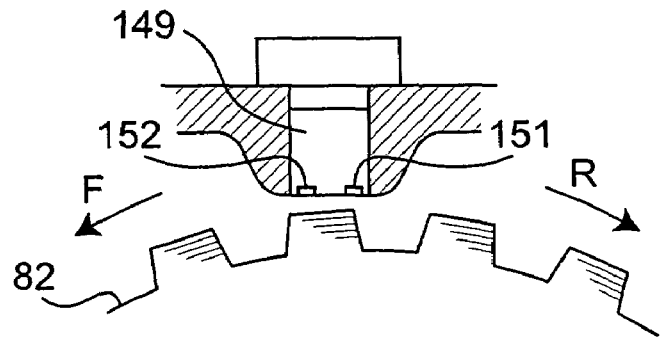
FIG. 10 is a cross sectional view showing detection means of the vehicle speed and of the backward movement according to a third embodiment of the present invention.
Figure 11:
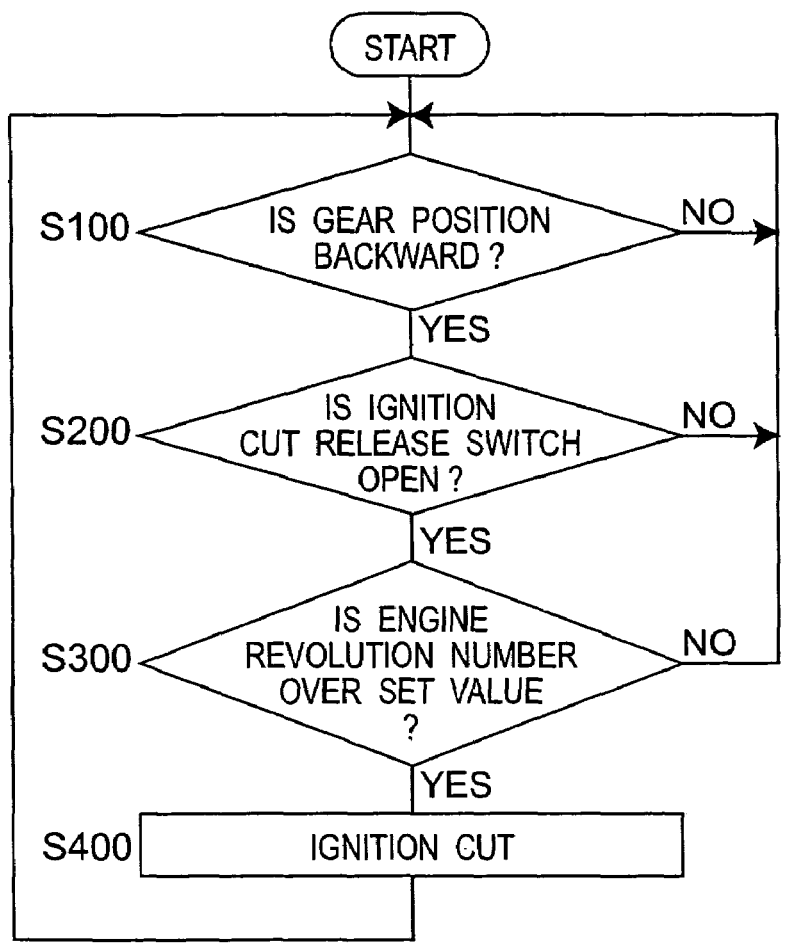
FIG. 11 is a flowchart showing steps taken by an engine control mechanism according to prior art.

Next, with reference to FIG. 10, a vehicle is described according to the third embodiment of the present invention.

That is, FIG. 10 is a cross sectional view showing detection means of the vehicle speed and of the backward movement according to the third embodiment of the present invention, and the figure shows a single sensor 149 which functions as a vehicle speed sensor and as a backward movement detection sensor. As shown in the figure, there are provided a pair of detection elements 151, 152 inside a single sensor case, in which the first detection element 151 and the second detection element 152 are arranged with a predetermined distance between the detection elements 151, 152 in a direction in which the bevel gear 82 rotates.

According to the third embodiment, at least one of the detection elements 151, 152 detects the vehicle speed, and it is determined whether the vehicle moves forward or backward, on the basis of a sequence of which detection element 151, 152 firstly detects the tooth of the bevel gear 81. For example, when the first detection element 151 detects the gear tooth first, it is determined that the vehicle is running forward. On the contrary, when the second detection element 152 detects the gear tooth first, it is determined that the vehicle is running backward.

Although the present invention has been fully described in connection with the preferred embodiments thereof with reference to the accompanying drawings, it is to be noted that various other changes and modifications are also apparent to those skilled in the art. Such changes and modifications are to be understood as included within the scope of the present invention as defined by the appended claims unless they depart therefrom.

What is claimed is:

1. An all-terrain vehicle having a belt converter, comprising:
   a vehicle speed detection mechanism for detecting a vehicle speed of the vehicle;
   a backward movement detection mechanism for detecting a backward movement of the vehicle; and
   an engine control mechanism for automatically controlling an engine speed of an engine of the vehicle, so as to make the vehicle speed lower than a predetermined vehicle speed, when the backward movement detection mechanism detects the backward movement of the vehicle and when the vehicle speed detection mechanism detects that the vehicle speed reaches the predetermined vehicle speed;
   wherein the engine control mechanism controls the engine speed by limiting an ignition of the engine.

2. An all-terrain vehicle having a belt converter, comprising:
   a vehicle speed detection mechanism for detecting a vehicle speed of the vehicle;
   a backward movement detection mechanism for detecting a backward movement of the vehicle; and
   an engine control mechanism for automatically controlling an engine speed of an engine of the vehicle, so as to make the vehicle speed lower than a predetermined vehicle speed, when the backward movement detection mechanism detects the backward movement of the vehicle and when the vehicle speed detection mechanism detects that the vehicle speed reaches the predetermined vehicle speed;
   wherein the engine control mechanism controls the engine speed by limiting a supply of fuel to the engine.

3. An all-terrain vehicle having a belt converter, comprising:
   a vehicle speed detection mechanism for detecting a vehicle speed of the vehicle;
   a backward movement detection mechanism for detecting a backward movement of the vehicle;
   an engine control mechanism for automatically controlling an engine speed of an engine of the vehicle, so as to make the vehicle speed lower than a predetermined vehicle speed, when the backward movement detection mechanism detects the backward movement of the vehicle and when the vehicle speed detection mechanism detects that the vehicle speed reaches the predetermined vehicle speed; and
   a gear transmission, wherein the backward movement detection mechanism is a mechanism for detecting that the gear transmission is shifted to a position for the backward movement of the vehicle.

4. The all-terrain vehicle as claimed in claim 3, wherein the backward movement detection mechanism detects a backward position of a shift rod of the gear transmission.

5. The all-terrain vehicle as claimed in claim 4, wherein the backward movement detection mechanism has an approximate switch arranged so as to oppose an edge surface of the shift rod.

6. An all-terrain vehicle having a belt converter, comprising:
   a vehicle speed detection mechanism for detecting a vehicle speed of the vehicle;
   a backward movement detection mechanism for detecting a backward movement of the vehicle;
   an engine control mechanism for automatically controlling an engine speed of an engine of the vehicle, so as to make the vehicle speed lower than a predetermined vehicle speed, when the backward movement detection mechanism detects the backward movement of the vehicle and when the vehicle speed detection mechanism detects that the vehicle speed reaches the predetermined vehicle speed; and
   a rotation member, wherein a rotational direction of the rotation member when the all-terrain vehicle moves forwards is opposite to a rotational direction of the rotation member when the all-terrain vehicle moves backward;
   wherein the backward movement detection mechanism is a mechanism for detecting the rotational direction of the rotation member when the all-terrain vehicle moves backward.

7. An all-terrain vehicle having a belt converter, comprising:
   a vehicle speed detection mechanism for detecting a vehicle speed of the vehicle;
   a backward movement detection mechanism for detecting a backward movement of the vehicle; and
   an engine control mechanism for automatically controlling an engine speed of an engine of the vehicle, so as to make the vehicle speed lower than a predetermined vehicle speed, when the backward movement detection mechanism detects the backward movement of the vehicle and when the vehicle speed detection mechanism detects that the vehicle speed reaches the predetermined vehicle speed;

wherein the predetermined vehicle speed, as a reference to execution of the control of the engine speed by the engine control mechanism, is set to be one of a first speed at which the belt converter starts an automatic shift from a state of a generally maximum reduction ratio in speed when the all-terrain vehicle accelerates backward with a throttle of the engine opening wide, and a second speed in the vicinity of the first speed.

* * * * *